United States Patent [19]

Crosman, III et al.

[11] Patent Number: 5,834,858
[45] Date of Patent: Nov. 10, 1998

[54] EMERGENCY POWER SUPPLY

[75] Inventors: Alexander C. Crosman, III, Downers Grove; Thomas Schubert, Hoffman Estates; William R. Sandman, Mount Prospect, all of Ill.

[73] Assignee: Electronic Design & Manufacturing Inc., Schaumburg, Ill.

[21] Appl. No.: 661,228

[22] Filed: Jun. 10, 1996

Related U.S. Application Data

[63] Continuation-in-part of Ser. No. 417,216, Apr. 5, 1995, abandoned.

[51] Int. Cl.$^6$ .................................................. H02J 7/00
[52] U.S. Cl. ................................ 307/66; 307/82; 307/85; 307/86
[58] Field of Search ............................. 307/64, 661, 82, 307/85, 86; 363/37, 123, 125, 126, 127, 131, 132, 133; 364/481, 493, 492; 320/2, 5, 13, 27, 30, 28, 57; 322/88

[56] References Cited

U.S. PATENT DOCUMENTS

| | | | |
|---|---|---|---|
| 3,771,012 | 11/1973 | Niederjohn | 307/66 |
| 3,801,794 | 4/1974 | Mauch et al. | 307/66 |
| 3,993,943 | 11/1976 | Bratton et al. | |
| 3,999,077 | 12/1976 | Borkovitz et al. | 307/66 |
| 4,506,766 | 3/1985 | Watanabe | 307/66 |
| 4,547,719 | 10/1985 | Sakamoto et al. | 318/723 |
| 4,666,020 | 5/1987 | Watanabe | 307/66 |
| 4,670,702 | 6/1987 | Yamada et al. | 307/66 |
| 4,709,318 | 11/1987 | Gephart et al. | 307/66 |
| 4,719,550 | 1/1988 | Powell et al. | 307/66 |
| 4,823,247 | 4/1989 | Tamoto | |
| 4,935,861 | 6/1990 | Johnson, Jr. et al. | |
| 4,980,812 | 12/1990 | Johnson, Jr. et al. | |
| 4,985,819 | 1/1991 | Mori et al. | 307/66 |
| 5,010,469 | 4/1991 | Bobry | 307/66 |
| 5,160,851 | 11/1992 | McAndrews | 307/66 |
| 5,185,536 | 2/1993 | Johnson, Jr. et al. | 307/66 |
| 5,218,288 | 6/1993 | Mickal et al. | 307/66 |
| 5,229,650 | 7/1993 | Kita et al. | 307/66 |
| 5,241,217 | 8/1993 | Severinsky | 307/64 |
| 5,289,046 | 2/1994 | Gregorich et al. | 307/66 |
| 5,302,858 | 4/1994 | Folts | 307/66 |
| 5,347,164 | 9/1994 | Yeh | 307/66 |
| 5,384,792 | 1/1995 | Hirachi | 307/64 |
| 5,616,968 | 4/1997 | Fujii | 307/66 |

FOREIGN PATENT DOCUMENTS

| | | |
|---|---|---|
| 0420628 | 4/1991 | European Pat. Off. . |
| 0480846 | 4/1992 | European Pat. Off. . |
| 0605199 | 7/1994 | European Pat. Off. . |
| 9621966 | 7/1996 | WIPO . |

OTHER PUBLICATIONS

Hirachi, et al., Cost–Effective Pratical Developments of High–Performance 1kVA Ups With New System Configurations and their specific control implementations, pp. 2.035–2.040 (Sep. 1995).

*Primary Examiner*—Jeffrey A. Gaffin
*Assistant Examiner*—Peter Ganjian
*Attorney, Agent, or Firm*—Wood, Phillips, VanSanten, Clark & Mortimer

[57] ABSTRACT

According to the present invention, an emergency power supply to be coupled to an electric power source providing an incoming AC signal may include an input/output terminal, a battery with a DC voltage, a rectifier coupled directly to the input/output terminal and connected to the battery, an inverter coupled directly to the input/output terminal and connected to the battery, and a control circuit coupled to the rectifier and the inverter so that in a first operational mode the rectifier is coupled to the battery to rectify an incoming AC signal at the input/output terminal to charge the battery and the inverter is decoupled from the battery, and in a second operational mode the inverter is coupled to the battery to invert the DC voltage to provide an outgoing AC signal at the input/output terminal and the rectifier is decoupled from the battery.

19 Claims, 7 Drawing Sheets

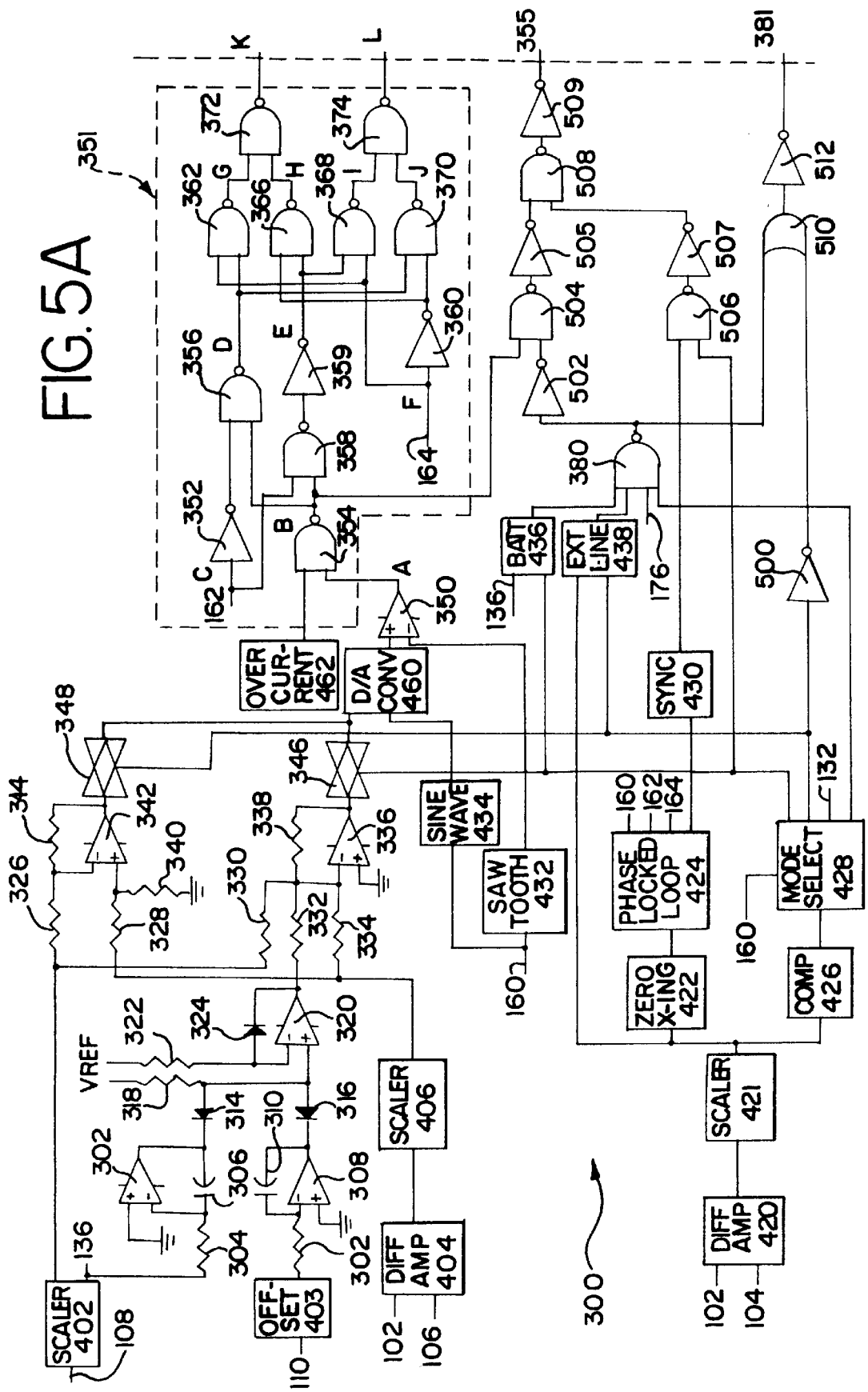

FIG 5A-1

EMERGENCY POWER SUPPLY

This is a continuation-in-part of application Ser. No. 08/417,216, filed Apr. 5, 1995, now abandoned.

FIELD OF THE INVENTION

The present invention relates to emergency power supplies. In particular, the present invention relates to an emergency power supply coupled directly to the external and internal lines.

BACKGROUND OF THE INVENTION

In case of a sudden power outage, it is common for homeowners and businesses alike to rely on emergency power supplies to meet at least part of their power consumption needs. A simple emergency power supply commonly may comprise nothing more than one or more DC batteries coupled to a discharge unit, or inverter, which converts the DC battery voltage to an AC signal, useful in a 120 VAC, 60 Hz circuit. Additionally, a battery charger may be included to recharge the batteries during normal power conditions.

Typically, the battery charger and the inverter are isolated from the internal and external lines through the use of one or more transformers at the input to the charging circuit and/or the output of the inverter circuit. This isolation allows for the design of the inverter circuit and the charging circuit to be simplified. However, the cost of including one or more transformers in the design of the power supply increases the costs of the power supply significantly.

There also exists a more complex type of emergency power supply, known as an uninterruptable power supply, or UPS, which is particularly designed to maintain a constant source of power under all conditions. UPS are primarily used in computer applications, where the momentary loss of power to the computer could result in the loss of data stored in the computer's memory.

FIG. 1 shows a block diagram of a UPS used in computer applications. Coupled between a source of electrical power 10, which could be a 120 VAC, 60 Hz line, and a load 40, such as a computer, is a static bypass line 30 with an accompanying switch 32. Also coupled between power source 10 and load 40, and in parallel with static bypass line 30 and switch 32, is the series combination of a rectifier 20, a power factor correction circuit 22, a node 24 coupled to a battery 26, and an inverter 28.

UPS can generally be classified in one of two major categories: on-line or off-line. In an on-line UPS, the current flows through the series combination of rectifier 20, power factor correction circuit 22, node 24, and inverter 28 during normal operation, static bypass line 30 being operative by closing switch 32 only during maintenance of the power supply or in case of UPS failure. In an off-line UPS, the current flows normally through static bypass line 30, while in emergency situations switch 32 is opened and the current flows from battery 26 through inverter 28 and thence to load 40. When the line power comes back on, the current flows through the series combination of the rectifier 20, the power factor correction circuit 22, the battery 26 and the inverter 28 until the battery charge is fully restored. For illustrative purposes, reference will be made to an on-line UPS.

In on-line UPS operation, the current flows first through rectifier 20, which converts the incoming AC signal to a DC signal. The DC signal then passes through power factor correction circuit 22, which controls the signal to achieve a power factor of unity, thereby optimizing the charging of battery 26 during charge mode. Lastly, the current flows through inverter 28, which converts the DC voltage back into an AC signal, useful in load 40.

In case of power outage or voltage drop, battery 26 is already in circuit and immediately begins to discharge through inverter 28. Inverter 28 converts the DC voltage of battery 26 to, for example, a 120 VAC, 60 Hz signal, usable by load 40. When power from power source 10 is resumed, battery 26 is recharged through rectifier 20 and power factor correction circuit 22 in anticipation of the next power outage.

As with the first example, the UPS emergency power supply has certain drawbacks. A power factor correction circuit 22, comprising usually of a special-purpose integrated circuit and/or additional switching devices, is required to optimize the charging of the batteries, adding further cost. Additionally, the UPS emergency power supply also commonly features a transformer on the input and output of the power supply to isolate the power supply from the internal and external lines.

SUMMARY OF THE INVENTION

According to the present invention, an emergency power supply to be coupled to an electric power source providing an incoming AC signal may include an input/output terminal, a battery with a DC voltage, a rectifier coupled directly to the input/output terminal and connected to the battery, an inverter coupled directly to the input/output terminal and connected to the battery, and a control circuit coupled to the rectifier and the inverter so that in a first operational mode the rectifier is coupled to the battery to rectify an incoming AC signal at the input/output terminal to charge the battery and the inverter is decoupled from the battery, and in a second operational mode the inverter is coupled to the battery to invert the DC voltage to provide an outgoing AC signal at the input/output terminal and the rectifier is decoupled from the battery.

The rectifier may further include a first diode with a first terminal coupled to the input/output terminal and a second terminal connected to the battery, a second diode with a first terminal coupled to the input/output terminal and a second terminal connected to the battery, a third diode with a first terminal connected to the battery and a second terminal coupled to the input/output terminal, and a fourth diode with a first terminal connected to the battery and a second terminal coupled to the input/output terminal.

The inverter may further include a first switching element with a first terminal coupled to the input/output terminal and a second terminal connected to the battery, a second switching element with a first terminal connected to the battery and a second terminal coupled to the input/output terminal, a third switching element with a first terminal coupled to the input/output terminal and a second terminal connected to the battery, and a fourth switching element with a first terminal coupled to the input/output terminal and a second terminal connected to the battery, the control circuit coupled to the first, second, third and fourth transistors so that the first, second, third and fourth transistors are switched to provide an alternating current signal on the input/output terminal from the DC voltage. Moreover, the rectifier may further include the first, second, third, and fourth switching elements, the control circuit coupled to the first, second, third and fourth switching elements so that the first, second, third and fourth switching elements are switched to rectify the AC signal to provide a direct current signal to charge the battery.

The first, second, third, and fourth switching elements may be isolated gate or bipolar transistor. The switching element may also be MOSFET transistors having an internal diode. Moreover, the rectifier may further include a first diode connected with a first terminal coupled to the input/output terminal and a second terminal connected to the battery, a second diode connected with a first terminal coupled to the input/output terminal and a second terminal connected to the battery, the internal diode of the first switching element, and the internal diode of the third switching element.

The control circuit may further include a sine-wave generator, a sawtooth generator, and a comparator coupled to the sine-wave generator and the sawtooth waveform generator to provide a pulse-width modulated signal to control the inverter.

BRIEF DESCRIPTION OF THE DRAWINGS

In describing the preferred embodiment of the present invention, reference is made to the accompanying drawings wherein like parts have like reference numerals, and wherein.

DESCRIPTION OF THE PREFERRED EMBODIMENT

Figure 1:
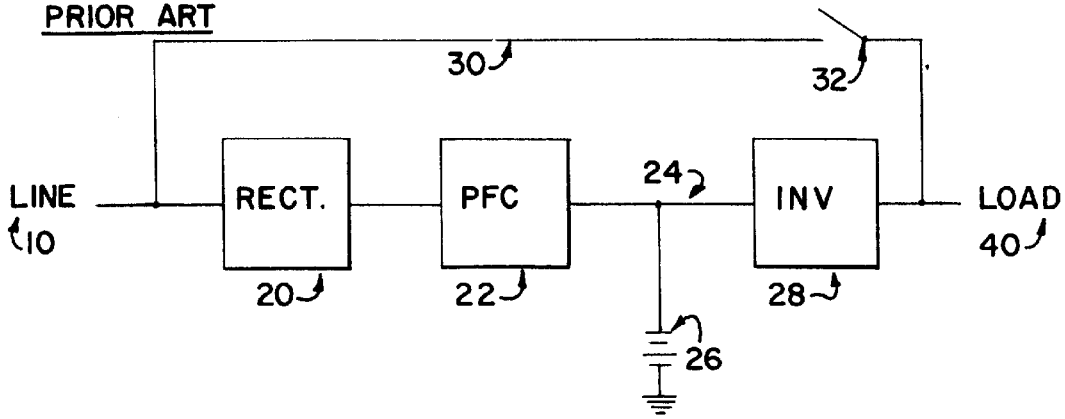
FIG. 1 is a block diagram of a prior art uninterruptable power supply.
Figure 2:
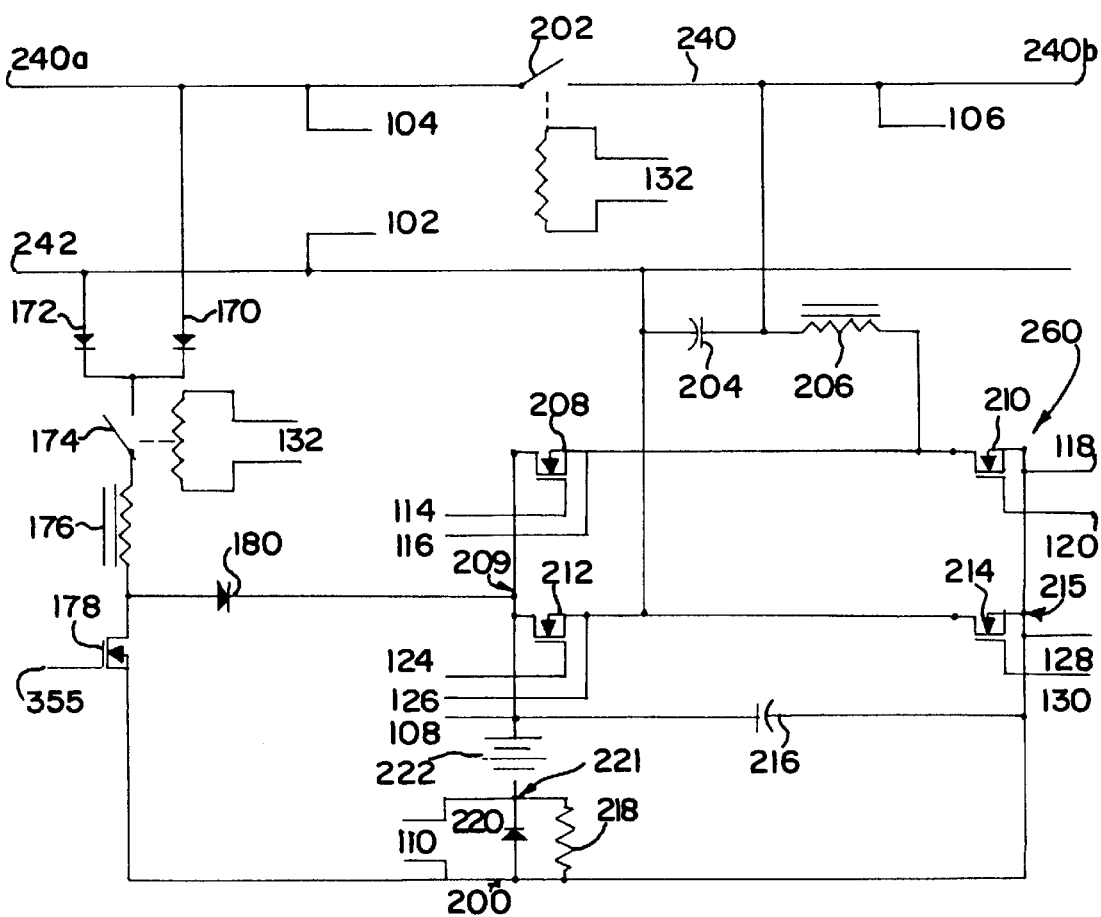
FIG. 2 is a schematic diagram of the power circuitry according to one embodiment of the present invention.

In a preferred embodiment of the present invention, a full-bridge converter formed of four transistors is coupled in parallel with a half-bridge of diodes, as shown in FIG. 2 (power circuit 200). During the charge mode, the half-bridge of diodes and the freewheeling diodes integral to two of the transistors form a full-bridge converter or rectifier for charging the DC voltage battery or battery array. During the discharge mode, the full-bridge converter formed of the four transistors is controlled by signals produced by the FIGS. 5A and 5B circuit (logic circuit 300) based on signals supplied from power circuit 200 to generate an AC signal. Pulse-width modulation is used to control the transistors, as appropriate, depending on voltage and current requirements and/or conditions.

Figure 3:
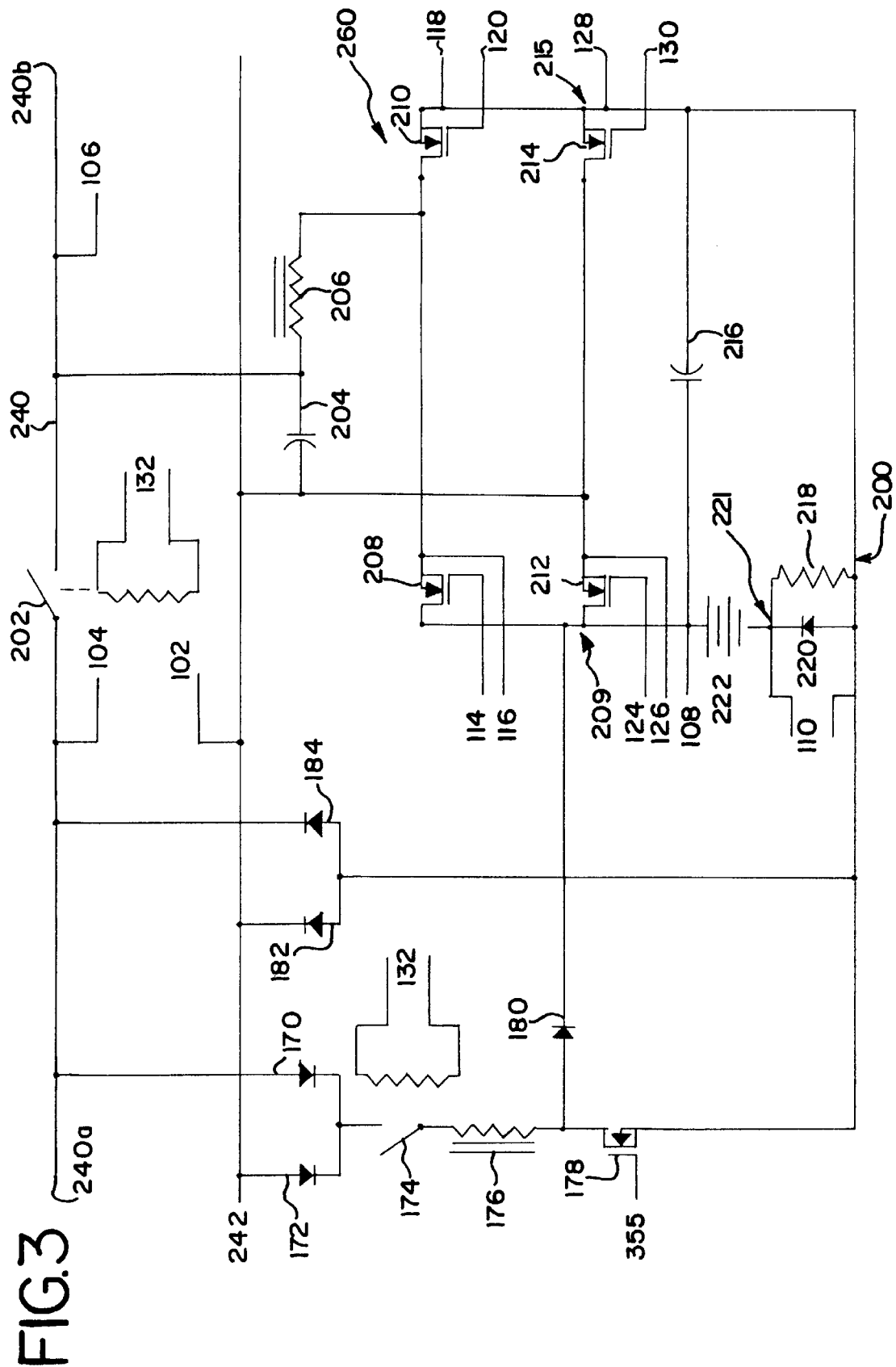
FIG. 3 is a schematic diagram of the power circuitry according to another embodiment of the present invention.

In another embodiment of the present invention, a full-bridge converter formed of four transistors is coupled in parallel with a full-bridge of diodes, as shown in FIG. 3 (power circuit 200). During the charge mode, the full-bridge of diodes rectifies an incoming AC signal to charge the DC voltage battery or battery array. During the discharge mode, the full-bridge converter formed of the four transistors is controlled by signals produced by the FIGS. 5A and 5B circuit (logic circuit 300) based on signals supplied from power circuit 200 to generate an AC signal. Pulse-width modulation is used to control the transistors, as appropriate, depending on voltage and current requirements and/or conditions.

Figure 4:
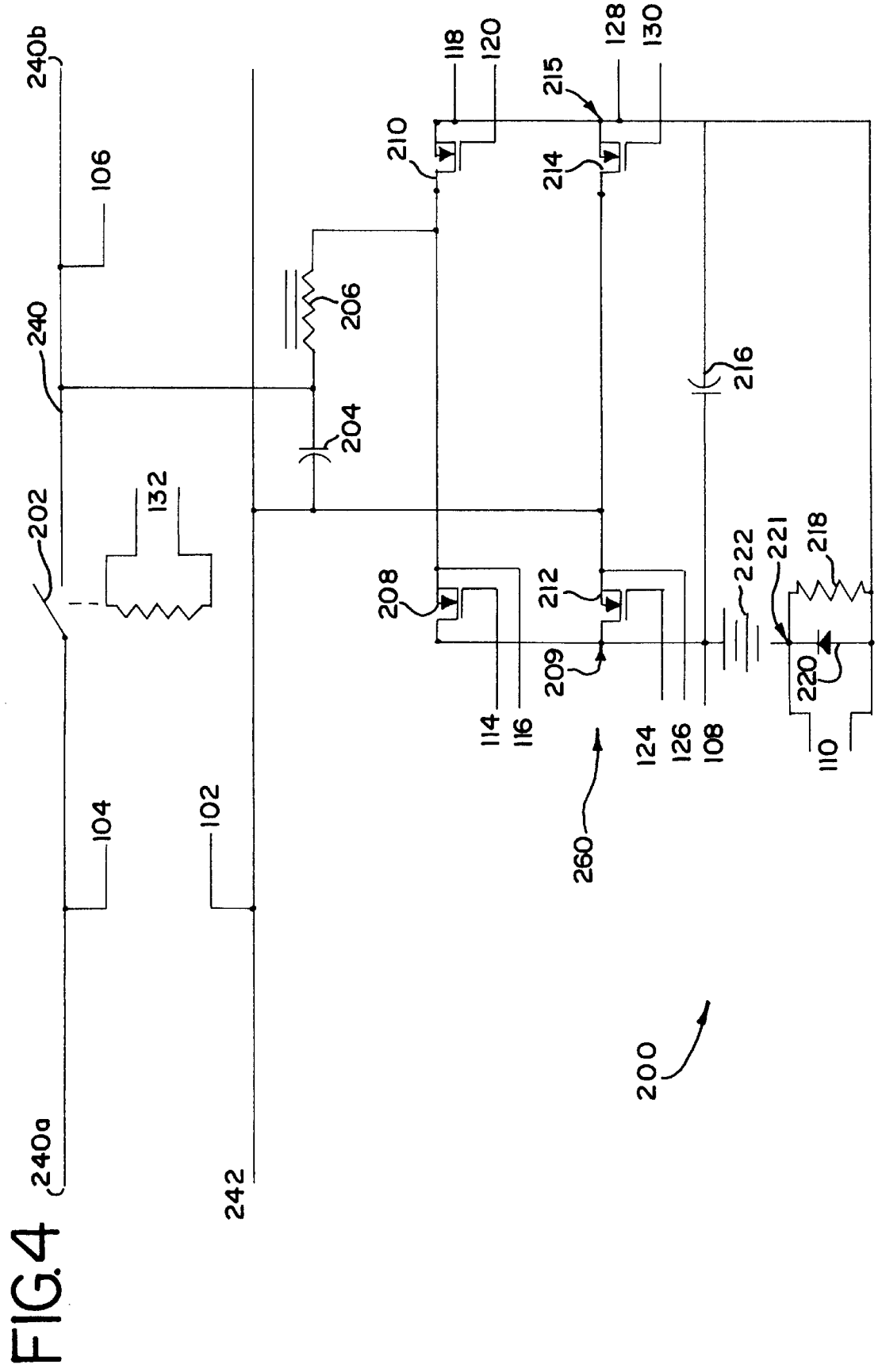
FIG. 4 is a schematic diagram of the power circuitry according to a further embodiment of the present invention.

In a further embodiment of the present invention, a full bridge converter is formed of four transistors, as shown in FIG. 4. The transistors are controlled by signals produced by the FIGS. 5A' and 5B circuit (logic circuit 300) based on signals supplied from power circuit 200. In particular, logic circuit 300 receives these power circuit signals and determines whether to enter or exit one of two operational modes, charge mode or discharge mode. In either mode, pulse-width modulation is used to control the transistors, as appropriate, depending on voltage and current requirements and/or conditions. A more detailed explanation will now be given.

FIG. 2 shows power circuit 200 according to a preferred embodiment of the present invention. Power circuit 200 is coupled to a voltage line 240 and a neutral line 242. Preferably, the power circuit 200 is permanently coupled to voltage line 240 and neutral line 242, although one skilled in the art would realize that this connection is made through the use of a three-prong electrical connector which can be plugged into an electrical circuit outlet.

A switching element 202 breaks voltage line 240 into two segments, an external line segment 240a and an internal line segment 240b. Preferably, switching element, or relay, 202 is inductively controlled in response to a relay drive signal 132 received from FIG. 5A. Again, one skilled in the art would recognize that while an inductively controlled switching element is used in the preferred embodiment, other switching elements could be used in the present invention. Switching element 202 is used to prevent loss of current to external line segment 240a when the emergency power supply is in discharge node.

Figure 5A-1:
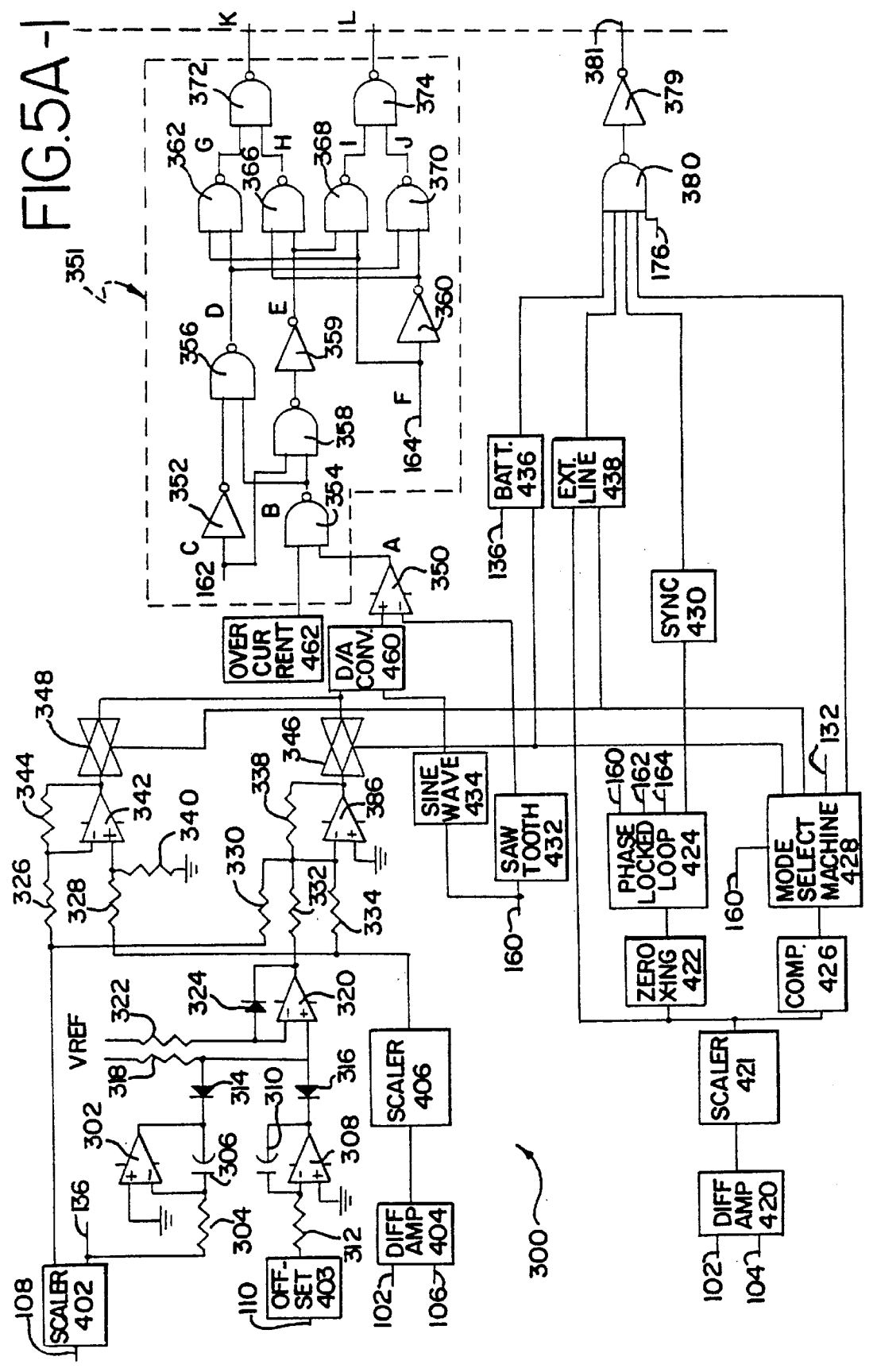
Figure 5B:
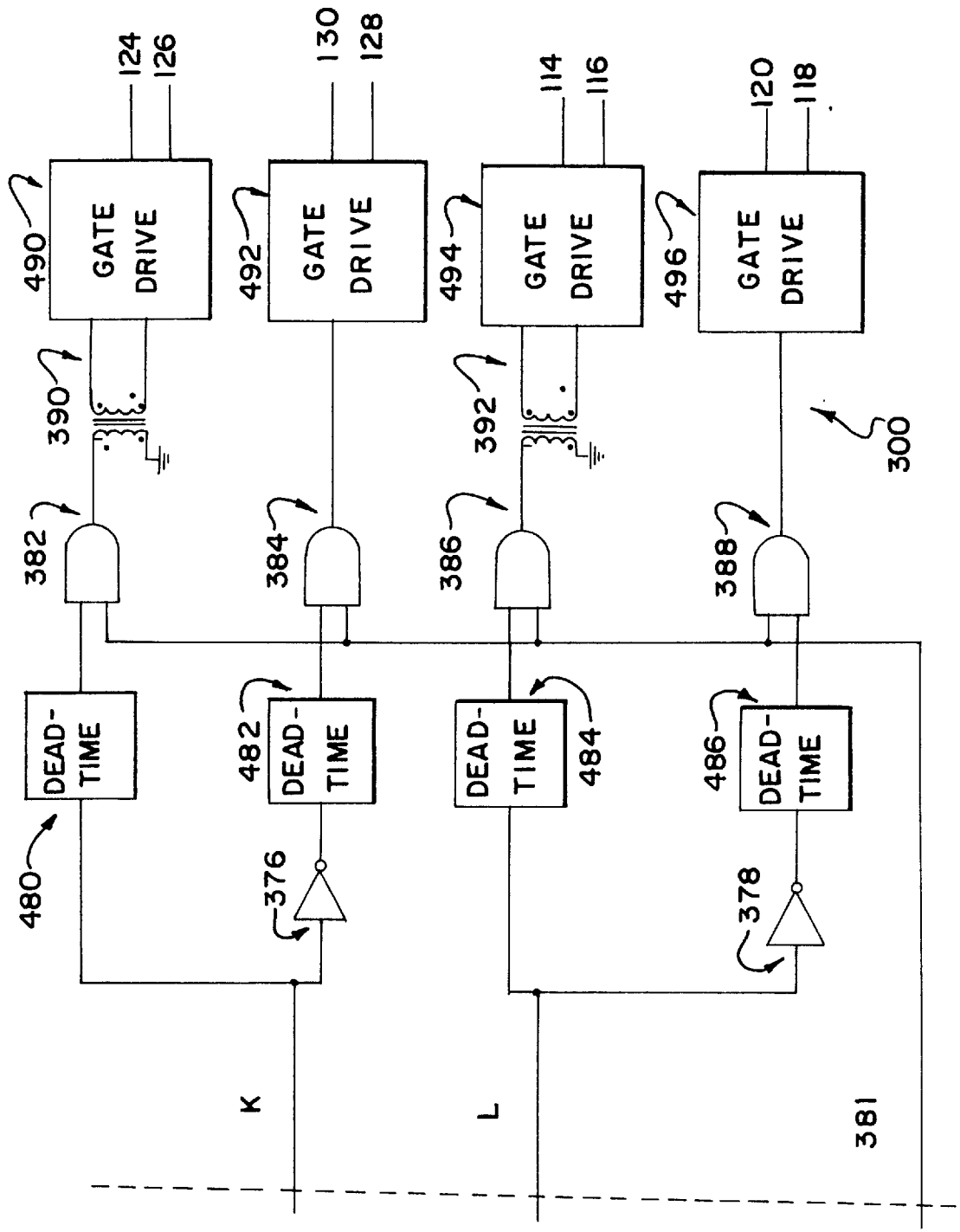
FIGS. 5A, 5A' and 5B are a schematic and block diagram of an embodiment of logic circuitry coupled to elements of FIGS. 2–4 according to aspects of the present invention.

A number of signals are taken off of voltage line 240 and neutral line 242 and supplied to logic circuit 300 as shown in FIG. 5A. A neutral line signal 102 is taken off of neutral line 242. An external line signal 104 is take off of external line segment 240a. Lastly, an internal line signal 106 is taken off of internal line segment 240b. The importance of these signals will be discussed in greater detail later with reference to FIGS. 5A and 5B, showing preferred logic circuit 300.

Coupled to external line segment 240a and neutral line 242 is a half-bridge of diodes 170, 172. The first terminal of diode 170 is coupled to external line segment 240a, and the first terminal of diode 172 is coupled to neutral line 242. The second terminals of diodes 170, 172 are coupled to the first terminal of a switching element, or relay, 174, inductively controlled in response to relay drive signal 132 received from FIG. 5A. Switching element 174 is coupled at its second terminal to an inductor 176. Inductor 176 is coupled to one terminal of a battery 222 via a diode 180, and is coupled to the other terminal of the battery 222 via a switching element 178.

In operation, switching element 174 is used to couple or decouple the portion of power circuit 200 which is used to rectify an incoming AC signal and charge the battery 222. Diodes 170, 172 and internal freewheeling diodes of transistors 210, 214 form a full-bridge rectifier through which an incoming AC signal is rectified to produce a DC output useful to charge battery 220. By opening the switch 174, the current paths through the battery 222 formed by diodes 170, 172 and freewheeling diodes of transistors 210, 214 are opened, effectively decoupling the rectifier from the battery 222 and the external line segment 240a and neutral line 242.

The series combination of inductor 176 and switching element 178 is used to boost the voltage of the rectified signal. For the power supply to provide an AC waveform of appropriate voltage magnitude in the discharge mode, the voltage of battery or battery array 222 must be greater than the peak voltage of the AC waveform to be generated because of voltage drops across transistors 208, 210, 212 and 214. However, the AC signal from which battery 222 is charged is commonly substantially equal in magnitude to the signal to be generated. Consequently, it is necessary to use the series combination of inductor 176 and switching element 178, preferably a MOSFET transistor, to boost the voltage of the rectified DC signal used to charge the battery to preferably achieve a higher voltage on the battery 222 than the peak voltage of the incoming AC signal rectified in charge mode or the AC signal generated in discharge mode. Transistor 178 is controlled by a boost converter signal 355 received from FIG. 5A.

At the other end of the power circuit 200, a high-frequency filter including a capacitor 204 and an inductor 206 is coupled to internal line segment 240b and neutral line 242. The function of the filter is to filter out the high-frequency signal and to smooth the AC waveform produced during the discharge mode of the present invention. Inductor 206 also stores energy to boost the DC link voltage above nominal line voltage during the charge mode.

A full-bridge converter or inverter 260 comprised of four switching elements, preferably n-channel MOSFET transistors, 208, 210, 212, and 214 is coupled to the high-frequency filter. While n-channel MOSFET transistors 208–214 are shown, p-channel transistors could be substituted, with corresponding changes to gate drive circuits 490–496 discussed below with respect to logic circuit 300. Alternatively, each of the MOSFET transistors could be replaced with the parallel combination of a bipolar transistor or an insulated gate transistor and a diode, where appropriate. Other types of semiconductor switching could also be employed, as is well known to those skilled in the art. In operation, the transistors are preferably switched at approximately 60 Khz switching frequency to provide a 120 VAC, 60 Hz signal during discharge mode.

The transistors are preferably configured in the following manner. The source of transistor 208 is coupled to the drain of transistor 210, while the drain of transistor 208 is coupled to the drain of transistor 212 at a node 209. Likewise, the source of transistor 212 is coupled to the drain of transistor 214, while the source of transistor 214 is coupled to the source of transistor 210 at a node 215. While this is a preferred embodiment of the present invention, each transistor 208, 210, 212, and 214 could in turn be coupled in parallel with additional transistors.

Coupled between node 209 and node 215 is a capacitor 216. One side of a parallel combination of a resistor 218 and a diode 220 is also connected to node 215. The other side of the combination of resistor 218 and diode 220 is connected at a node 221 to one side of battery 222, the other side of which is coupled to node 209.

In operation, capacitor 216 filters the high-frequency ripple current output of the rectifier to provide a substantially steady DC current for charging battery 222. Resistor 218 is a sense resistor coupled between capacitor 216 and battery 222 to stabilize the voltage during charge mode. Diode 220 is coupled across resistor 218 to reduce signal losses during discharge mode.

Various input and output signals are also coupled to this portion of the power circuitry, i.e. to nodes 209, 215, and 221. A battery voltage signal 108 is coupled to the positive electrode of capacitor 216. Similarly, a battery current signal 110 is connected across resistor 218. Signals 108 and 110 are supplied to logic circuit 300 as shown in FIG. 5A.

To control the switching of the transistors in full-bridge converter 260, gate signals 114, 120, 124, and 130 (from FIG. 5B) are coupled to the gate electrodes of transistors 208, 210, 212, and 214, respectively. Additionally, the sources of transistors 208, 210, 212, and 214 are coupled to source signals 116, 118, 126, and 128, also from logic circuit 300 from FIG. 5B. These source signals are required to provided a proper voltage potential from gate-to-source of the transistor, so as to allow logic circuit 300 to switch the transistors on and off during operation.

In the embodiment shown in FIG. 3, the power circuit 200 is substantially similar to that shown in FIG. 2, with the addition of two diodes 182, 184 to form the rectifier of the power circuit 200. Diodes 182 and 184 in this embodiment of the present invention take the place of the internal freewheeling diodes of transistors 210, 214 used in the embodiment of the invention shown in FIG. 2.

In the embodiment shown in FIG. 4, the full-bridge converter 260 comprised of four switching elements, preferably n-channel MOSFET transistors, 208, 210, 212, and 214 connected to the high-frequency filter functions both as a rectifier and an inverter. In operation, the transistors are preferably switched at approximately 60 Khz switching frequency to provide a 120 VAC, 60 Hz signal during discharge mode, and a nominal 230 V direct current signal to a battery 222 during the charge mode. The remainder of the description provided above regarding the configuration of the transistors in converter 260 applies in substantial part for this embodiment of the invention as well.

FIGS. 5A and 5B show a logic circuit 300 which is useful with embodiments of the power circuit 200 shown in FIGS. 2 and 3, powered under all conditions by battery 222 (see FIG. 2), which circuit controls the switching of relays 174 and 202 and converter 260 in response to voltage and current signals received from power circuit 200. FIGS. 5A' and 5B show a logic circuit 300 which is useful with the embodiments of power circuit 200 shown in FIG. 4, which circuit controls the switching of relays 202 and converter 260 in response to voltage and current signals received from power circuit 200.

Although the embodiments show a logic circuit 300 comprised of discrete circuit and logic components, the pulse-width modulation control used in the preferred embodiment could also be implemented using devices well known to those of skill in the art, e.g., microprocessors. Furthermore, while pulse-width modulation is preferably used to control the switching of the transistors in converter 260, those skilled in the art would also know to control converter 260 through the use of techniques such as, e.g., discrete pulse modulation (wherein control is achieved according to an integral number of resonant cycles), delta (or hysteresis-band) modulation (wherein control is achieved according to changes in load current), or by switching the transistors off and on at precalculated times, which times have been previously chosen mathematically so as to eliminate certain harmonics or to minimize the total harmonic distortion of the output waveform.

As can be seen at the far left of FIGS. 5A and 5A', logic circuit 300 is supplied with five signals from power circuit 200: battery voltage signal 108, battery current signal 110, neutral line signal 102, external line signal 104, and internal line signal 106. Similarly, logic circuit 300 supplies to power circuit 200 either nine or ten control signals, depending on the configuration of the power circuit 200: gate signals 114, 120, 124, and 130, source signals 116, 118, 126, and 128, relay drive signal 132, and boost converter signal 355 (embodiment of logic circuit 300 shown in FIG. 5A). The gate and source signals are shown at the far right hand of FIG. 5B. The relay drive signal is shown near the center bottom of FIGS. 5A and 5A', while the boost converter signal is shown at the far right hand side of FIG. 5A.

Turning first to FIG. 5A, at the center of logic circuit 300 is a multiplying digital-to-analog (D/A) converter 460, a sawtooth waveform generator 432, and a comparator 350, preferably a type LM339 comparator. In operation, it is comparator 350 that creates the pulse-width modulation signal, useful in controlling the boost converter circuit in charge mode and converter 260 in discharge mode. Specifically, the pulse-width modulation signal is created by comparing the high-frequency sawtooth signal produced by sawtooth generator 432 against a scaled version of a rectified sine-wave signal produced by the multiplying D/A converter 460.

By using such a control configuration, a single sinusoidal reference can be used to generate the pulse-width modulation signals for both the charge and discharge modes. The immediate advantage of using a sinusoidal reference in both charge and discharge mode is that the current drawn from the line during charge mode is sinusoidal in shape, allowing for simplified power factor correction without resorting to additional circuitry for that purpose.

A first scaling reference voltage, relating battery voltage and internal line voltage, is useful in controlling the discharge mode. It can be selectively coupled to multiplying D/A converter 460 by closing a switch 348, preferably a type 4066 CMOS switch. A second scaling reference voltage, relating the battery voltage, battery current, and internal line voltage, is useful in controlling the charge mode. It can be coupled to multiplying D/A converter 460 by closing a switch 346, also preferably a type 4066 CMOS switch. According to the preferred embodiment of the invention, the scaling reference voltages for charge and discharge modes, connected to switches 346 and 348, respectively, are produced in the following manner.

To produce the discharge mode scaling reference voltage, battery voltage signal 108 from FIG. 2 is coupled to a scaler 402, constructed according to methods known in the art. Scaler 402 scales the incoming battery voltage signal 108 down to a logic-level DC voltage useful in the remainder of the circuitry. Scaler 402 also subtracts an offset voltage from the scaled battery voltage signal 108.

Similarly, the neutral line signal 102 and the internal line signal 106 (also taken from FIG. 2) are supplied to a differential amplifier 404, the output of which is coupled to a scaler 406. Scaler 406 provides a negative DC signal proportional to the magnitude of the AC signal of the internal line voltage, less a voltage offset.

The output from scaler 402 is coupled to the inverting input of a summing linear amplifier 342 through resistor 326, and the output from scaler 406 is coupled to the non-inverting input of amplifier 342 through a voltage divider comprised of resistors 328 and 340. Linear amplifier 342, as well as linear amplifiers 302, 308, 320, and 336, illustratively are type LM 324 operational amplifiers. Also connected to the inverting input of linear amplifier 342 is a feedback resistor 344, which couples the inverting input of linear amplifier 342 with the output.

The output of linear amplifier 342 thus generated is representative of the combination of a feedforward from the battery voltage and a feedback from the internal line voltage. Furthermore, because of the offset involved in both the scaled battery voltage and internal line voltage signals, combined with the inversion of summing linear amplifier 342 for the battery voltage signal and the inversion of scaler 406 for the internal line voltage signal, if either the battery voltage or the internal line voltage drops, the scaling reference voltage rises to compensate. Therefore, the discharge mode scaling reference voltage corrects for changes in battery voltage or load demand. The output of linear amplifier 342 is coupled to one of the inputs of CMOS switch 348.

To produce the charge mode scaling reference voltage, for those aspects of the embodiments of the invention that require such a reference voltage to be generated, the output of scaler 402, also designated as signal 136, is coupled to the inverting input of an integrating linear amplifier 302 through resistor 304. Also coupled to the inverting input is a capacitor 306, which is coupled between the inverting input and the output of linear amplifier 302. The non-inverting input of linear amplifier 302 is coupled to ground. Thus, the output of linear amplifier 302 represents an inverted, scaled version of the integration of the battery voltage signal less an offset voltage.

Similarly, the battery current signal 110 from FIG. 2, after being offset by offset circuit 403, is coupled to the inverting input of an integrating linear amplifier 308 through a resistor 312. Also, a capacitor 310 is coupled between the inverting input and the output of linear amplifier 308. The non-inverting input of linear amplifier 308 is coupled to ground. Thus, the output of linear amplifier 308 represents an inverted, scaled version of the integration of the battery current signal less an offset.

The output of linear amplifier 308 is then coupled to the non-inverting input of linear amplifier 320 through a diode 316. Similarly, the output of linear amplifier 302 is coupled to the non-inverting input of linear amplifier 320 through a diode 314. Lastly, a positive reference voltage is coupled to the non-inverting input of linear amplifier 320 through a resistor 318.

The positive reference voltage is also coupled to the inverting input of amplifier 320 through a resistor 322. Additionally, a diode 324 is coupled between the inverting input and the output of linear amplifier 320.

In this configuration, the linear amplifier 320 operates as a lowest voltage detector. In this fashion, during charge mode, whichever charge control, battery voltage or battery current, is most in need of control will dominate so as to adjust the charging power and maintain either a maximum charging current or a maximum charging voltage.

The output of linear amplifier 320 is then coupled via resistor 332 to the inverting input of summing linear amplifier 336. The output of scaler 402, via resistor 330, and the output of scaler 406, via resistor 334, are also coupled to the inverting input of amplifier 336. The non-inverting input of amplifier 336 is coupled to ground. A feedback resistor 338 is coupled between the inverting input and the output of linear amplifier 336.

The output of linear amplifier 336 thus generated is representative of the combination of a feedback from the battery voltage, a feedforward from the internal line voltage, and a feedback from the lowest voltage detector, linear amplifier 320. Furthermore, because of the configuration of the inputs, unlike the discharge mode scaling reference voltage, the charge mode scaling reference voltage rises to meet drops in battery voltage, but falls when the internal line voltage or battery current falls. The output of amplifier 336 is also coupled to an input of a second CMOS switch 346, and represents the charge mode scaling reference voltage.

To determine whether the power supply should be placed into either discharge or charge mode, a preliminary determination must be made of whether the external line voltage is above a preset threshold voltage, or whether the emergency power supply should be activated. To make this determination, the neutral line signal 102 and the external line voltage input 104 (both from FIG. 2) are coupled to a differential amplifier 420. The output of the differential amplifier 420 is then coupled to a scaler 421, which scales the voltage to a logic-level voltage.

The scaled output of scaler 421 is supplied to a comparator 426. Comparator 426 determines whether the scaled external line voltage is above a preset level, preferably scaled to correspond to an actual voltage of 90 V.

The output of the comparator 426 is coupled to a mode select state machine 428, fabricated according to the knowledge of one skilled in the art. State machine 428 selects the appropriate mode depending on whether or not the external line voltage is above the preset voltage level, as indicated by comparator 426.

If comparator 426 signals that the external line voltage is under 90 VAC, state machine 428 activates switch 348, thereby coupling the discharge mode scaling reference voltage to multiplying D/A converter 460. Furthermore, for the embodiments shown in FIGS. 2 and 3, if the comparator 426 signals that the external line is below 90 VAC, then mode select machine 428 sends a signal 132 to switch 174, causing it to open, thereby opening the current paths from the external line 240a and the neutral line 242 to battery 222. Moreover, for the embodiments shown in FIGS. 2 and 3, the control circuit 300 disables the boost converter circuit as explained in greater detail herein.

If comparator 426 signals that the external line voltage is above 90 VAC, the state machine 428 activates switch 346, thereby coupling the charge mode scaling reference voltage to multiplying D/A converter 460. In the embodiments shown in FIGS. 2 and 3, if comparator 426 signals that the external line voltage is above 90 VAC, switch 174 is also allowed to remain closed, thereby coupling the half-bridge or full-bridge of diodes to the battery 222. Additionally, in the embodiments shown in FIGS. 2 and 3, boost converter signal 355 is sent to transistor 178 to activate the boost converter circuit.

Once the determination is made which scaling reference voltage should be coupled to multiplying D/A converter 460 according to external line conditions, the appropriate scaling reference voltage is combined with the sine-wave reference signal, produced by a sine-wave reference circuit 434. Preferably, the sine-wave reference is stored digitally in ROM (Read-Only Memory), although other equivalent methods of sine-wave reference generation well known to those skilled in the art can be utilized.

The output of multiplying D/A converter 460 is coupled to the non-inverting input of a comparator 350. Coupled to the inverting input of comparator 350 is the output of sawtooth waveform generator 432. In operation, comparator 350 compares the scaled, rectified sine-wave signal from multiplying D/A converter 460 with the high-frequency sawtooth signal from sawtooth generator 432 to generate a pulse-width modulation signal.

Figure 6:
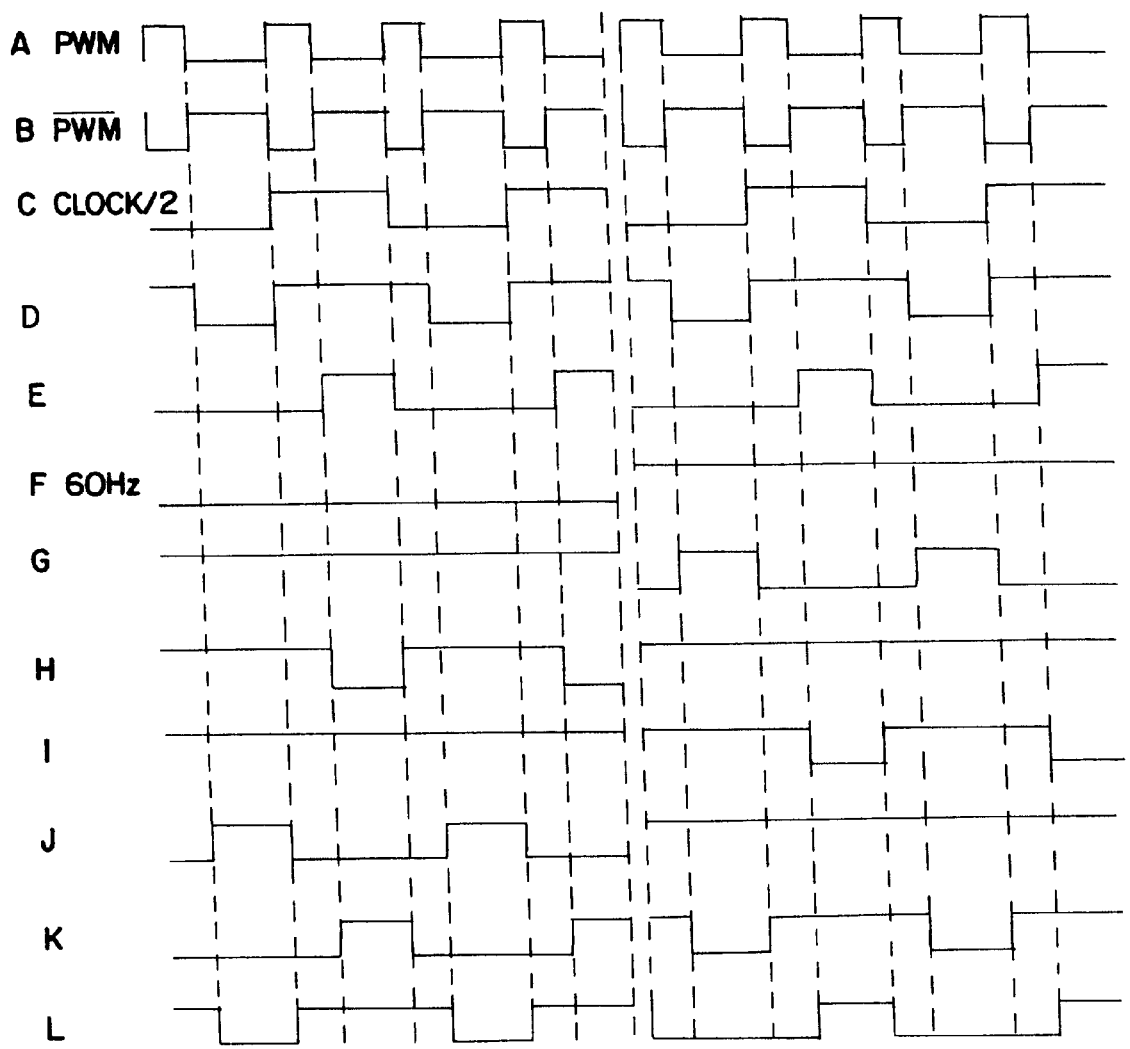
FIG. 6 is a timing diagram of showing the operational relationship of the stages of a splitter contained in the logic circuitry shown in FIGS. 5A–5B.

The pulse-width modulation signal produced by comparator 350 is then supplied to splitter 351. If discharge mode is selected, the pulse-width modulation signal is passed through the entirety of splitter 351 before being supplied to the gate drive circuitry shown in FIG. 5B. FIG. 6 shows a timing diagram corresponding to the operation of splitter 351 preferably used to produce a pair of pulse-width modulation signals useful in controlling the converter 260 in discharge mode. The pulse-width modulation signal produced by comparator 350 is shown as signal A in FIG. 6, while the resultant signals are shown as signals K and L. Because of the wide difference in the frequencies of the different signals used in the operation of the splitter 351 (ranging from 60 Khz for the preferred pulse-width modulation signal to 60 Hz for the line signal 164), the timing diagram has been condensed as marked to show a representative selection of timing waveforms.

Initially, to ensure that converter 260 is not operated under undesirable current conditions, the signal A is supplied first to a pre-screening stage of the splitter 351. In doing so, the output of comparator 350 is coupled to one of the inputs of a NAND gate 354. Another input of NAND gate 354 is coupled to an output of an overcurrent protection circuit 462. Overcurrent protection circuit 462 protects converter 260 from carrying too much current by reducing the width of the pulse-width modulation pulses, if and when needed. Provided the current is within acceptable bounds, an inverted form of pulse-width modulation signal A (shown as signal B in FIG. 6) will be passed to the first stage of a splitter 351.

First stage of splitter 351 comprises NAND gates 356 and 358, and NOT gate 359. The output of NAND gate 354 is coupled to one input of NAND gate 356 and one input of NAND gate 358. A second input of NAND gate 358 is coupled to receive a CLOCK/2 signal 162 (signal C in FIG. 6) produced by the phase-locked loop 424, the operation of which is discussed below. A second input of NAND gate 356 is coupled to the output of a NOT gate 352, which receives CLOCK/2 signal 162.

The output of this first stage of splitter 351 is a pair of signals (signals D and E in FIG. 6) representative of the pulse-width modulation signal and operating at half of the pulse-width modulation signal frequency. However, the output of the first stage is representative of a rectified sinewave. The second stage of splitter 351 is supplied with signals D and E from the first stage and converts this to the pulse-width modulation signals K and L used to operate converter 260 and create a full sinusoidal signal.

The second stage of the splitter 351 includes NAND gates 362, 366, 368, 370, 372 and 374, and is coupled to the first stage in the following manner. The output of NAND gate 356 is coupled to first inputs of NAND gates 362 and 370. The output of NOT gate 359 is coupled to first inputs of NAND gates 366 and 368. Coupled to the second input of gates NAND 362 and 368 is a 60 Hz signal 164, also produced by the phase-locked loop 424, as further discussed in detail below. Coupled to second inputs of gates 366 and 370 is the output of NOT gate 360, which is in turn coupled to receive the 60 Hz signal 164.

Signals G, H, I, and J are supplied from NAND gates 362, 366, 368, and 370 to a second tier of NAND gates 372 and 374. The resultant signals K and L, as shown in FIG. 6 represent the pulse-modulation which will cause each side of converter 260 to share the switching losses equally among all the switching elements of each side of converter 260 by alternatively turning off and then on into the load.

Turning now to FIG. 5B, signals K and L from FIG. 5A are further divided into separate signals for each of the two transistors on each side of comparator 260. Accordingly, the outputs of NAND gates 372 and 374 are divided, and one portion of each output is coupled to respective NOT gates 376 and 378. By coupling one portion of each output to a NOT gate, each of the transistors on each side of full-bridge converter 260 is configured to operate in an alternating fashion.

The individual transistor pulse-width modulation signals are then supplied to deadtime circuits, 480, 482, 484, and 486. The deadtime circuits 480, 482, 484, and 486 function to provide a small amount of time between each switching cycle so as to allow individual transistors to turn fully off before the next transistor in sequence is turned fully on. These are illustratively deadtime circuits that can be implemented by the skilled artisan in a variety of ways, such as by a resistor-capacitor network.

The four outputs of the deadtime circuits 480, 482, 484 and 486 are coupled to respective first inputs of AND gates 382, 384, 386, and 388. Second inputs of AND gates 382, 384, 386, and 388 are coupled to the protective and mode determining logic circuitry of circuit 300 as shown in FIG. 5A.

In the preferred embodiment of the present invention, there are four undesirable conditions under which preferably converter 260 should not be operated;

1. battery 222 is fully discharged;
2. external line voltage is low, unless state machine 428 indicates that circuits 200 and 300 are in discharge mode;
3. battery 222 has been removed; and
4. a valid mode (preferably charge or discharge mode) has not been selected.

Each of these four undesirable conditions is monitored by a different protective circuit. Thus, a protective circuit 436 determines whether battery 222 has been fully discharged. One input to circuit 436 as shown in FIG. 3 is the output of scaler 402, indicated as internal signal 136. Another input to protective circuit 436 is a charge mode output of state machine 428. Using circuitry well known to one skilled in the art, protective circuit 436 does not send an alarm signal to master protective control gate 380 when battery 222 is not fully discharged or the charge mode has been selected.

A protective circuit 438 determines whether the external line voltage is low. Coupled to the inputs of circuit 438 is the output of scaler 421 and a discharge mode output of state machine 428. Using circuitry well known to one skilled in the art, protective circuit 438 does not send an alarm signal to master protective control gate 380 when either the line voltage is above a threshold level, preferably 107 V, or the discharge mode has been selected.

In addition, a signal is sent by the state machine 428 as a protective feature to master protective control gate 380 to acknowledge that a given mode has been selected. Preferably, an additional internal signal 176 is sent, using circuitry well known to one skilled in the art, to master protective control gate 380 to acknowledge that battery 222 is present (i.e. connected in power circuit 200). However, if battery 222 is permanently coupled to the power circuit 200, then there is no need to provide this signal to the master protective control NAND gate 380.

As a result, four different protective circuit signals may be created and supplied to master protective control NAND gate 380, which is in turn coupled to one of the inputs of OR gate 510. If the output of NOT gate 500 indicates that the power circuit 200 is in discharge mode, and if none of the four undesirable conditions has occurred, then OR gate 506 will provide, via NOT gate 512, an enable signal 381. If the inputs to OR gate 506 indicate that the power circuit 200 is in charge mode, or one or more of the four undesirable conditions has occurred, then the OR gate 506 will provide, via not gate 512, the inverse of enable signal 381, thereby disabling, or decoupling, converter 260 from the power circuit 200.

Given enable signal 381 from master protective control gate 380, the pulse-width modulation signal will be supplied to each of gate drive circuits 490, 492, 494, and 496. In accordance with the pulse-width modulation signal, as modified for each transistor of each side of the converter 260, gate drives circuits 490, 492, 494, and 496 will switch converter 260 to achieve either charge or discharge mode by selectively turning transistors 208, 210, 212, and 214 on and off at appropriate intervals.

Gate drives circuits 490 and 494 are isolated from the logic circuitry by pulse transformers 390 and 392, respectively. This isolation is necessary as gate drives 490 and 494 must raise the voltage potential from the gate-to-source of transistors 208 and 212, respectively, to allow these transistors to be switched into conduction. Preferably, gate drive circuits 490 and 494 are each powered by pulse transformers 390 and 392.

If charge mode is selected, then the pulse-width modulation signal is passed out of splitter 351 after the initial pre-screening stage, NAND gate 354. The output of NAND gate 354 is coupled to the series combination of NAND gate 504 and NOT gate 505. The other output of NAND gate 504 is coupled, via NOT gate 502 to the output of the master protective control NAND gate 380, the operation of which has already been explained with reference to the discharge control circuitry. If none of the four undesirable conditions identified above occurs, then the pulse-width modulation signal is passed on to the series combination of NAND gate 508 and NOT gate 509.

The other input of NAND gate 508 is coupled to the output of the series combination of NAND gate 506 and NOT gate 507. One input of the NAND gate 506 is coupled to the charge mode select line. The other input of NAND gate 506 is coupled to a protective circuit 430 which determines whether the boost converter circuitry is synchronized to the incoming AC signal.

Protective circuit 430 determines whether the boost converter circuitry is synchronized both in frequency and phase with the external line in the following fashion. The output of scaler 421 is coupled to the input of a zero-crossing detector 422, which produces a pulse train synchronized to the zero-crossings of the output signal of scaler 421. The pulse train from zero-crossing detector 422 are coupled to the input of a phase-locked loop 424. Phase-locked loop 424 processes the pulse train received from the zero-crossing detector 422 and produces a CLOCK signal 160, a CLOCK/2 signal 162 and a 60 Hz signal 164, each of which has been mentioned previously, and an fourth signal representative of the frequency and phase of the external line as compared with processed 60 Hz signal 164. (Although not mentioned previously, CLOCK signal 160 is also coupled to sine-wave reference circuit 434, sawtooth waveform generator 432 and mode select state machine 428.)

Specifically, in operation, phase-locked loop 424 first produces the CLOCK signal 160. From CLOCK signal 160, phase-locked loop 424 produces the 60 Hz signal 164 by feeding the CLOCK signal 160 through a divide-by-n circuit, and then adjusting the CLOCK signal 160 until 60 Hz signal 164 matches the output of the zero-crossing detector 422 in frequency and in phase. If the 60 Hz signal 164 produced by the phase-locked loop 424 is not synchronized in frequency and phase with signal from the zero-crossing detector 422, then the phase-locked loop 424 signals the protective circuit 430 that the 60 Hz signals are not synchronized. Phase-locked loop 424 continues to correct the processed signal 60 Hz signal 164 until the actual and processed signals are synchronized. Again using circuitry well known to one skilled in the art, based on the input from phased-locked loop 424, protective circuit 430 does not send an alarm signal to NAND gate 506 when phase-locked loop 424 and protective circuit 430 determined that the boost converter circuitry is synchronized in frequency and phase with the external line.

If the boost converter circuitry is synchronized, and if the charge mode is selected, then the output of the series combination of NAND gate 506 and NOT gate 507 will supply a signal to NAND gate 508 indicating that the boost converter circuitry should be activated. If none of the other undesirable conditions have occurred, boost converter signal 355 will be sent to transistor 178, activating the boost converter circuitry. If any one or more of the five undesirable conditions occurs, or if discharge mode is selected, the protective circuitry will deactivate the boost converter circuitry via signal 355.

The embodiment of the logic circuit 300 shown in FIG. 5A' differs from the logic circuit 300 shown in FIG. 5A only with respect to those elements required to control the operation of the boost converter circuitry shown in power circuit 200 in FIGS. 2 and 3 and to disable converter 260 in the charge mode. A single master protective control NAND gate 380 prevents operation of the converter 260 if any one or more of the following five conditions occurs:

1. battery 222 is fully discharged, unless state machine 428 indicates that circuits 200 and 300 are in charge mode;
2. external line voltage is low, unless state machine 428 indicates that circuits 200 and 300 are in discharge mode;
3. battery 222 has been removed;
4. converter 260 is no longer synchronized both in frequency and phase with the external voltage, unless state machine 428 indicates that circuits 200 and 300 are in discharge mode; and
5. a valid mode (preferably charge or discharge mode) has not been selected.

Otherwise, the embodiments of logic circuit 300 shown in FIG. 5A and 5A' operate in substantially similar fashion, and the discussion regarding the embodiment in FIG. 5A is equally applicable to that in FIG. 5A'.

Operation

In operation, if the differential voltage between the neutral line 242 and the external voltage line 240a drops below 90 V, then comparator 426 will signal state machine 428 that the line voltage has dropped below the preset emergency level. At this point, the mode select state machine 428 opens switch 202 to prevent the discharge current from the converter 260 from traveling back along the external line 240a. In the embodiments shown in FIGS. 2 and 3, mode select machine 428 sends signal 132 to relay 174, causing relay 174 to open, thereby decoupling the elements of the rectifier from the battery 222, the external line 240a and the neutral line 242. Additionally, in FIGS. 2 and 3, the boost converter circuitry is deactivated according to boost converter signal 355 sent to transistor 178.

The state machine 428 also closes CMOS switch 348, coupling the discharge mode scaling reference voltage to the multiplying D/A converter 460. This discharge mode scaling reference voltage is representative of the battery voltage, as measured at node 209, and the internal line voltage, as measured by the difference between the voltage of the internal line segment 240b and the neutral line 242. As mentioned previously, the battery voltage and the internal line voltage are combined such that the discharge mode scaling reference voltage increases to meet decreasing battery voltage or internal line voltage, indicative of an increased load.

Comparator 350 compares the scaled, rectified sine-wave output of the multiplying D/A converter 460 against the high-frequency sawtooth reference waveform produced by the sawtooth waveform generator 432. As explained above, the output of comparator 350 is a pulse-width modulation signal which can be used to control the switching of the four transistors of the converter 260. The pulse-width modulation signal, as shown in FIG. 6 as signal A, is then supplied to the splitter 351.

After passing pre-screening gate 354, the pulse-width modulation signal is applied to the first stage of splitter 351, NAND gates 356 and 358, to yield two signals D and E. The signals D and E are supplied to the second stage of the splitter 351, NAND gates 362, 366, 368, 370, 372 and 374 to create signals K and L, one for each side of converter 260.

The signals K and L are then split to provide separate pulse-width modulation signals for each of the transistors 208, 210, 212 and 214 of the converter 260. After providing for a time delay to allow the orderly switching of the transistors in converter 260, and provided the enable signal 381 is present, the resulting pulse-width modulation signals are passed to gate drives 490, 492, 494, and 496, which the switch the transistors of the converter 260 to convert the DC voltage of battery 222 into a 120 VAC, 60 Hz signal on the internal line segment 240b.

Once the external line voltage returns above 90 V, comparator 426 signals state machine 428 to change logic circuit 300 from discharge mode to charge mode. In response, state machine 428 signals switching element or relay 202 to close, and thereby to reconnect the power circuit 200 to the external line segment 240a. Depending on the embodiment of the present invention, control circuit 300 may stop sending signal 132 to relay 174, causing relay 174 to close, and may send signal 355 to transistor 178, to activate the boost converter circuitry. Additionally, state machine 428 opens switch 348 and closes switch 346, coupling the charge mode scaling reference voltage to multiplying D/A converter 460.

In the embodiment of the present invention shown in FIG. 2, after the boost converter has been charged, closing relay 174 causes current to flow alternatively through the path defined by diode 170, inductor 176, diode 180, battery 222, resistor 218 and internal diode of transistor 214 or through the path defined by diode 172, inductor 176, diode 180, battery 222, resistor 218 internal diode of transistor 210, and inductor 206. The boosted, rectified voltage thus generated is used to charge the battery 222.

In the embodiment of the invention shown in FIG. 3, the after the boost converter has been charged, closing relay 174 causes current to flow alternatively through the path defined by diode 170, inductor 176, diode 180, battery 222, resistor 218 and diode 182 or through the path defined by diode 172, inductor 176, diode 180, battery 222, resistor 218 and diode 184. The boosted, rectifier voltage thus generated is used to charge the battery 222.

In the embodiment of the invention shown in FIG. 4, the charge mode scaling reference voltage is generated, representative of the battery voltage, as measured at node 209, and the internal line voltage, as measured by the difference between the voltage of the internal line segment 240b and the neutral line 242, and the battery current, as measured at resistor 218. As mentioned previously, unlike charge mode, the battery voltage, the battery current and the internal line voltage in discharge mode are combined such that the discharge mode scaling reference voltage increases to meet decreasing battery voltage, but decreases if the internal line voltage, which in this mode is also representative of the external line voltage, or battery current also decreases.

By coupling the charge mode scaling reference voltage to the multiplying D/A converter 460, a charging pulse-width modulation signal is produced by comparator 350 by comparing the scaled, rectified sine-wave produced by multiplying D/A converter 460 with the high-frequency sawtooth waveform from the sawtooth waveform generator 432. As mentioned previously, the use of a sinusoidal reference waveform has the added advantage of simplifying the control of the power factor correction in the charge mode.

The charge mode pulse-width modulation signal is supplied to splitter 351 and from thence to gate drive circuits 490, 492, 494, and 496. Gate drive circuits 490, 492, 494 and 496 then switch the transistors of converter 260 to boost the AC line signal to a DC signal through inductor 206, and thereby recharge the battery 222.

While this invention has been described with reference to the illustrative embodiments, it will be understood that this description is not intended to be construed in a limiting sense. Various modifications of the illustrative embodiments, as well as those other embodiments, will become apparent to those skilled in the art upon reference to this description. The invention is intended to be set forth in the following claims.

I claim:

1. An emergency power supply coupled to an electric power source providing an incoming AC signal, the emergency power supply comprising:
   an input/output means for receiving an AC signal;
   a battery with a DC voltage;
   a rectifier coupled directly to the input/output means and connected to the battery;
   an inverter coupled directly to the input/output means and connected to the battery; and
   a control circuit coupled to the rectifier and the inverter so that in a first operational mode the rectifier is coupled to the battery to rectify an incoming AC signal at the input/output means to charge the battery and the inverter is decoupled from the battery, and in a second operational mode the inverter is coupled to the battery to invert the DC voltage to provide an outgoing AC signal at the input/output means and the rectifier is decoupled from the battery.

2. The emergency power supply according to claim 1, wherein the rectifier further comprises:
   a first diode with a first terminal coupled to the input/output means and a second terminal connected to the battery;
   a second diode with a first terminal coupled to the input/output means and a second terminal connected to the battery;
   a third diode with a first terminal connected to the battery and a second terminal coupled to the input/output means; and
   a fourth diode with a first terminal connected to the battery and a second terminal coupled to the input/output means.

3. The emergency power supply according to claim 1, wherein the inverter further comprises:
   a first switching element with a first terminal coupled to the input/output means and a second terminal connected to the battery;
   a second switching element with a first terminal connected to the battery and a second terminal coupled to input/output means;
   a third switching element with a first terminal coupled to the input/output means and a second terminal connected to the battery;
   a fourth switching element with a first terminal coupled to the battery and a second terminal connected to the input/output means; and
   the control circuit coupled to the first, second, third and fourth switching elements so that the first, second, third and fourth switching elements are switched to provide an alternating current signal on the input/output means from the DC voltage.

4. The emergency power supply according to claim 3, wherein the rectifier further comprises the first, second, third, and fourth switching elements, the control circuit coupled to the first, second, third and fourth switching elements so that the first, second, third and fourth switching elements are switched to rectify the AC signal to provide a direct current signal to charge the battery.

5. The emergency power supply according to claim 3, wherein the first, second, third, and fourth switching elements are transistors.

6. The emergency power supply according to claim 5, wherein the first, second, third and fourth switching elements are MOSFET transistors having an internal diode.

7. The emergency power supply according to claim 6, wherein the rectifier further comprises:
   a first diode connected with a first terminal coupled to the input/output means and a second terminal connected to the battery;
   a second diode connected with a first terminal coupled to the input/output means and a second terminal connected to the battery;
   the internal diode of the first switching element; and
   the internal diode of the third switching element.

8. An emergency power supply according to claim 5, wherein the transistors are insulated gate transistors.

9. An emergency power supply according to claim 5, wherein the transistors are bipolar transistors.

10. The emergency power supply according to claim 1, wherein the control circuit further comprises:
    a sine-wave generator;
    a sawtooth generator; and
    a comparator coupled to the sine-wave generator and the sawtooth waveform generator to provide a pulse-width modulated signal to control the inverter.

11. An emergency power supply coupled to an electric power source providing an incoming AC signal, the emergency power supply comprising:
    an input/output means for receiving an AC signal;
    a battery with a DC voltage;
    a rectifier coupled directly to the input/output means to produce a DC signal from an incoming AC signal;
    a means connected to the rectifier for increasing the voltage of the DC signal to produce an increased voltage DC signal, the voltage increasing means also being connected to the battery;
    an inverter coupled directly to the input/output means and connected to the battery; and
    a control circuit coupled to the rectifier and the inverter so that in a first operational mode the voltage increasing means is coupled to the battery to charge the battery with the increased voltage DC signal and the inverter is decoupled from the battery, and in a second operational mode the inverter is coupled to the battery to invert the DC voltage to provide an outgoing AC signal at the input/output means and the voltage increasing means is decoupled from the battery.

12. The emergency power supply according to claim 11, wherein the rectifier further comprises:
   a first diode with a first terminal coupled to the input/output means and a second terminal connected to the voltage increasing means;
   a second diode with a first terminal coupled to the input/output means and a second terminal connected to the voltage increasing means;
   a third diode with a first terminal connected to the voltage increasing means and a second terminal coupled to the input/output means; and
   a fourth diode with a first terminal connected to the voltage increasing means and a second terminal coupled to the input/output means.

13. The emergency power supply according to claim 12, wherein the first, second, third, and fourth switching elements are transistors.

14. The emergency power supply according to claim 13, wherein the first, second, third and fourth switching elements are MOSFET transistors having an internal diode.

15. The emergency power supply according to claim 14, wherein the rectifier further comprises:
   a first diode connected with a first terminal coupled to the input/output means and a second terminal connected to the voltage increasing means;
   a second diode connected with a first terminal coupled to the input/output means and a second terminal connected to the voltage increasing means;
   the internal diode of the first switching element; and
   the internal diode of the third switching element.

16. An emergency power supply according to claim 13, wherein the transistors are insulated gate transistors.

17. An emergency power supply according to claim 13, wherein the transistors are bipolar transistors.

18. The emergency power supply according to claim 11, wherein the inverter further comprises:
   a first switching element with a first terminal coupled to the input/output means and a second terminal connected to the battery;
   a second switching element with a first terminal connected to the battery and a second terminal coupled to the input/output means;
   a third switching element with a first terminal coupled to the input/output means and a second terminal connected to the battery;
   a fourth switching element with a first terminal coupled to the battery and a second terminal connected to the input/output means; and
   the control circuit coupled to the first, second, third and fourth switching elements so that the first, second, third and fourth switching elements are switched to provide an alternating current signal on the input/output means from the DC voltage.

19. The emergency power supply according to claim 11, wherein the control circuit further comprises:
   a sine-wave generator;
   a sawtooth generator; and
   a comparator coupled to the sine-wave generator and the sawtooth waveform generator to provide a pulse-width modulated signal to control the inverter.

* * * * *